United States Patent [19]

Buodd

[11] Patent Number: 5,565,012

[45] Date of Patent: Oct. 15, 1996

[54] SELF-CLEANING FUME EXTRACTION DEVICE

[75] Inventor: Torgeir Buodd, Tjodalyng, Norway

[73] Assignee: The Lincoln Electric Company, Cleveland, Ohio

[21] Appl. No.: 511,842

[22] Filed: Aug. 7, 1995

Related U.S. Application Data

[63] Continuation of Ser. No. 217,693, Mar. 25, 1994, abandoned.

[51] Int. Cl.$^6$ ................................................. B01D 41/00
[52] U.S. Cl. .................................. 55/294; 15/352; 55/302
[58] Field of Search ........................... 15/304, 321, 352; 55/294, 295, 296, 297, 298, 302

[56] References Cited

U.S. PATENT DOCUMENTS

| | | | |
|---|---|---|---|
| 356,243 | 1/1887 | Elkins | 55/298 |
| 1,498,061 | 6/1924 | Adams | 55/294 |
| 2,591,198 | 4/1952 | Ringe | 15/304 |
| 3,716,968 | 2/1973 | Mischke | 55/294 |
| 3,733,639 | 5/1973 | Timian | 15/304 |
| 3,936,902 | 2/1976 | Shackleton et al. | 15/304 |
| 3,958,296 | 5/1976 | Fell | 15/304 |
| 4,622,050 | 11/1986 | O'Connor | 55/283 |
| 4,725,292 | 2/1988 | Williams | 55/96 |
| 4,756,727 | 7/1988 | Howeth | 55/302 |
| 4,810,270 | 3/1989 | Terry et al. | 55/294 |
| 4,842,624 | 6/1989 | Barton | 55/291 |
| 4,895,581 | 1/1990 | Starling | 55/283 |
| 5,013,340 | 5/1991 | Taslim et al. | 55/290 |
| 5,143,528 | 9/1992 | Dongelmans | 55/294 |

FOREIGN PATENT DOCUMENTS

| | | | |
|---|---|---|---|
| 882563 | 11/1981 | U.S.S.R. | 55/294 |

*Primary Examiner*—C. Scott Bushey
*Attorney, Agent, or Firm*—Vickers, Daniels & Young

[57] ABSTRACT

A portable vacuum for fume and dust extraction includes a main housing shell, at least one fan within the shell for creating suction and a motor for driving the fan. A separate filter container is located within the main housing shell and a filter is located within the filter container for extracting fume and dust. Within the inner filter perimeter is located a generally H-shaped self propelled cleaning device having air outlets for cleaning the filter with compressed air and for rotating the cleaning device relative to the filter.

8 Claims, 3 Drawing Sheets

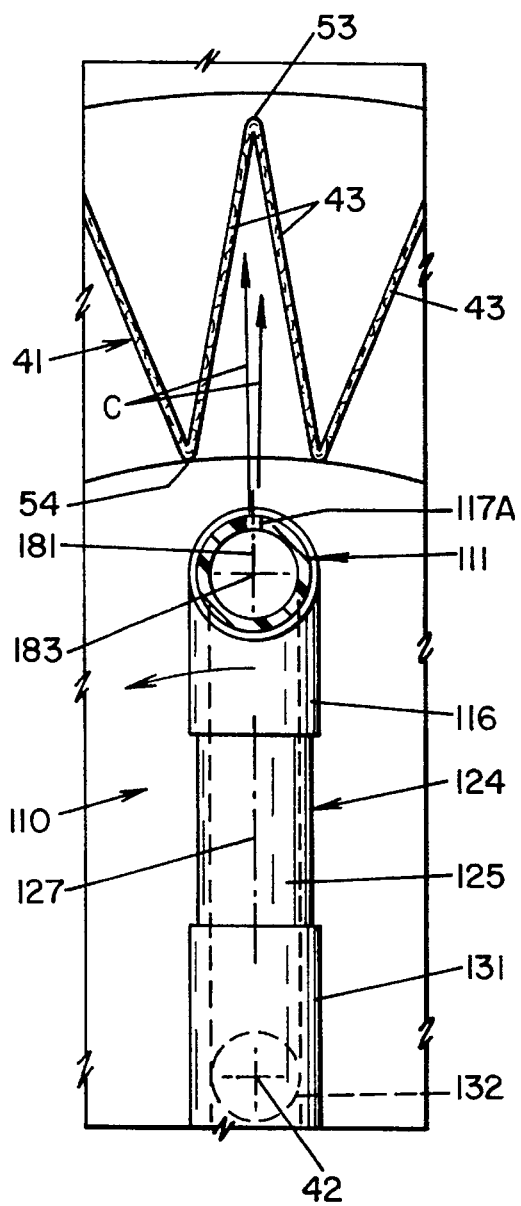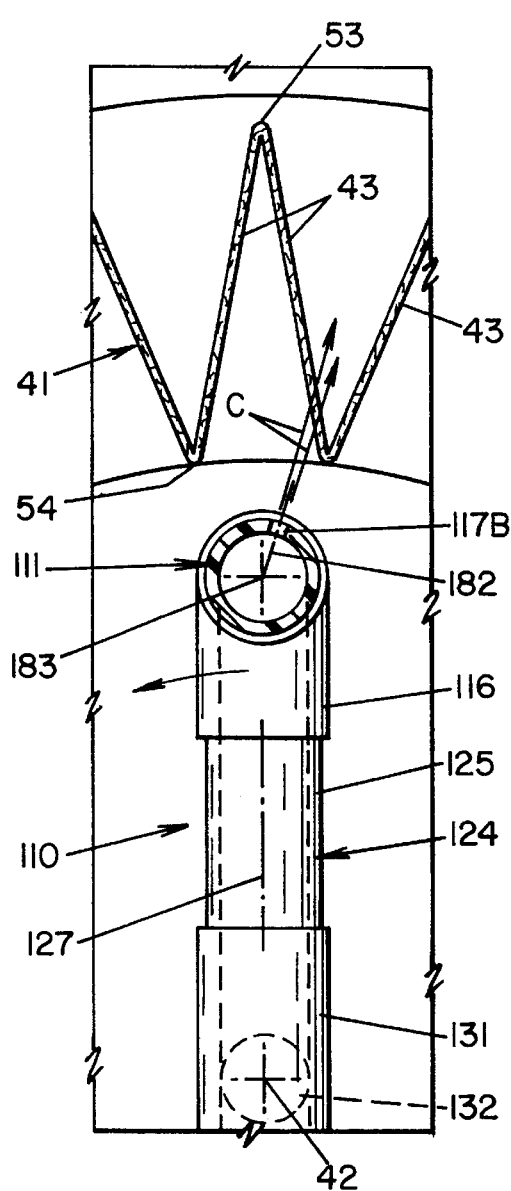

SELF-CLEANING FUME EXTRACTION DEVICE

This is a continuation of application Ser. No. 217,693, filed Mar. 25, 1994, now abandoned.

The present invention relates to a mobile, self-contained vacuum unit designed for fume and dust extraction from single work stations.

The invention is particularly applicable to and will be described with specific reference to a fume and dust extraction device having an integrated self-cleaning filter unit. However, it will be appreciated that the invention is applicable to any kind of vacuum unit in which it is desired to have an effective filter cleaning device to provide consistent vacuum pressure.

INCORPORATION BY REFERENCE

Shackleton et al., U.S. Pat. No. 3,936,902 is incorporated by reference herein so that background art relating to filter cleaning devices need not be described in detail herein.

BACKGROUND OF THE INVENTION

Air filters, as a means of removing impurities in surrounding air are well known in the prior art. Air filters are widely used on internal combustion engines, for example, to remove impurities from the air before the air enters an engine for combustion. Air filters are also used in vacuum units for cleaning and for air purification of work environments. Such air filters typically have air drawn through a filter medium, wherein particulate impurities in the air, such as smoke, dust and dirt are removed. After a period of time, the filters become less efficient as they become clogged with the trapped impurities. It is then necessary to remove and replace the filter or provide some means for cleaning the filter.

A number of methods are known and used to clean air filters. Such methods usually use air which is blown through the filters. The air flow is generally in the form of air pressure, air suction, air vacuum, or some combination. The most common filter is the annular rotary drum type, generally forming a cylindrical shape. It has been found that cleaning of such a filter by vacuum or suction is an inefficient method for removing particulate matter from the exterior surface of the filter. Generally, the prior art shows that a cleaning arrangement of the type in which vacuum or suction is used from the exterior surface requires more vacuum pressure than other types of cleaning arrangements. Further, a device used to clean an annular shaped filter with suction is necessarily a complicated device. Unless a standard manual vacuum is used, the device must be able to circumferentially traverse the exterior surface of the filter, usually by rotating about the axis of the filter. The vacuum cleaning device may be simplified if the suction arrangement is stationary and the filter rotates. However, in such arrangement it becomes necessary to provide a rather complicated filter container in order that both the filter and its supports can be rotated across the vacuum. Finally, vacuum pressure is usually more difficult to control properly. The desired suction is not always necessarily attainable or constant through a fixed nozzle, especially as particulate matter is drawn from the filter surface into the suction line reducing the vacuum pressure being applied to the filter surface.

Vibration is another commonly known and used method of cleaning an air filter. Vibration usually involves shaking the filter in order to loosen trapped impurities. This may be done to the filter while in place or after removing the filter from the cleaning unit. In certain arrangements, vibrations are induced by a striking mechanism in which the filter is struck repeatedly. Such an arrangement is undesirable in that wear is created on both the striking mechanism and the filter. Further, when the filter is shaken or struck in the cleaning unit, unnecessary vibration is induced in the cleaning unit itself.

Finally, another method of cleaning an air filter is using forced air flow directed outwardly from the interior annular surface of a cylinder shaped filter to automatically dislodge accumulated dust and other particulates by reverse air cleaning. Thus, particles which were generally trapped on the air filter along the outer perimeter during operation of the vacuum cleaning device are removed as air is forced through the filter to dislodge the particulate from the reverse direction. Such devices generally require either rotation of the filter or rotation of the cleaning unit, and air is normally directed to only localized areas of the filter at any one time. Further, the devices shown in the prior art require a mechanical drive arrangement to rotate either the filter or cleaning device. Such a device is disclosed in Shackleton et al., U.S. Pat. No. 3,936,902 herein incorporated by reference. Each of the above cleaning solutions is impractical and inefficient to clean the filter cartridges inside small, portable dust and smoke extraction units. Such units have too little space to accommodate complex cleaning assemblies and the associated drive motors. Additionally, drive motors add undesirable weight to portable vacuum units. A complex cleaning unit and/or drive motors further complicate the maintenance and reliability of vacuum units having an integral cleaning unit. Where no cleaning unit is provided, it is necessary to regularly change filters as they become clogged, and vacuum unit efficiency is therefore reduced. This increases down time and reduces efficiency in the work area. Further, new filter costs significantly increase the cost of operating such small vacuum units.

SUMMARY OF THE INVENTION

In accordance with the present invention, a separate filter or dust container is contained within the main housing shell. Within the filter container is a filter cartridge, and a cleaning device or cleaning unit is provided within the filter container. The separate filter container allows dust and particulate matter to be collected therein. Therefore, the filter may be cleaned several times before the filter container needs to be emptied. The cleaning device uses air under pressure, directed at the filter medium in order to dislodge particulate matter from the filter. The air is generally directed in a reverse direction from that caused during operation of the vacuum. This is generally in the direction from the inner perimeter toward the outer perimeter of the filter. The particulate matter is dislodged from the filter, remaining within the filter container.

The filter cleaning device is provided with a multiple air discharge arrangement which increases the cleaning efficiency. Thus, the number of times a filter can be cleaned is also increased. The multiple air discharge provides for each portion of the filter surface to be subjected to at least two blasts of air from the cleaning device for each one full 360° rotation of the cleaning unit. Thus, the time required for effective cleaning is decreased and cleaning efficiency is increased.

In accordance with a particular feature of the present invention, the cleaning device has at least two parallel air bars, each of which includes a plurality of air outlets therein.

The air outlets are arranged so that air pressure is directed from the air bars outwardly toward the inner perimeter of the air filter. The air outlets are further arranged so that the cleaning air directed from the air bars may move along the inner surfaces of the air filter to effectively dislodge the particulate matter on the outer surfaces of the air filter.

Preferably, the air bars are rotatable and arranged in diametrically opposed relationship which provides for rotation to be evenly balanced. Thus, the cleaning device is prevented from seizing up during rotation. In any event, the multiple air discharge concept of the cleaning device of the present invention provides for faster cleaning of the air filter, since each portion of the filter surface is subjected to at least two blasts of air from the cleaning device for each one full 360° rotation of the cleaning unit. The faster cleaning also provides for more efficient cleaning. Each stream of air from the air outlets effectively improves the work of the last stream or blast of cleaning air. Since at least two streams or blasts of air work the same surface area of the filter for each one rotation of the cleaning unit, the rotating cleaning unit provides at least two cleaning stages. The first cleaning stage, comprising a first air stream or blast, effectively loosens the dust or particulate matter from the filter with a first blast of air. The second cleaning stage, comprised of a second air stream or blast, blows the loosened dust and particulate matter off of the air filter before the particulates have time to resettle back onto the filter surface.

Additionally, the air bar geometry of the cleaning device provides for a minimum of moving parts. It is simple in structure and is light-weight. Thus a relatively small amount of energy is required to induce and maintain rotation of the cleaning unit. Maintenance of the cleaning unit is extremely simple, straight-forward and inexpensive. Further, the geometry of the cleaning unit promotes balanced rotating and little maintenance is ever required. The cleaning efficiency is such that the filter can be cleaned many times without removal, and when the filter container is filled up, it can be removed and emptied.

In accordance with another aspect of the invention, the portable vacuum for fume and dust extraction includes an integrated self-propelled cleaning unit. In this respect, one or more longitudinally extending air bars is provided with a plurality of air outlets which are arranged to be directed at the filter surface so that the air expelled from the air outlets cause a rotation of the air bar about the central axis of the filter. Thus, energy from the pressurized cleaning air is used to rotate the cleaning unit as well as for cleaning the filter surface. This is a very effective and efficient method of cleaning the filter in a portable vacuum unit. There is a minimum of moving parts which require little maintenance, and no motor or other drive mechanism is needed for the cleaning unit. Thus, the weight is reduced as is the expense of maintaining prior portable vacuum units. Therefore, a portable vacuum device having an integral self-cleaning unit in accordance with the invention is as economical to manufacture and maintain as comparable units without a self-cleaning feature. Preferably, the air propulsion feature is uniquely combined with a two air bar geometry of the cleaning device in order to optimize the efficiency of both cleaning and self-propulsion. Furthermore, such geometry of the cleaning unit provides the balance required in order that only a small amount of energy is necessary to start and maintain the rotation necessary for cleaning.

It is accordingly a principal object of the present invention to provide a portable vacuum for fume and dust extraction having an improved filter cleaning unit to maintain filter efficiency and vacuum pressure.

It is another object of the invention is to provide a portable vacuum unit of the foregoing character wherein an integrated filter cleaning unit is driven using the same pressurized air used to clean the filter.

Still another object of the invention is to provide a portable vacuum unit of the foregoing character wherein an integrated filter cleaning unit cleans the filter faster than those previously known in the prior art.

Yet another object of the present invention is to provide a portable vacuum unit of the foregoing character wherein an integrated filter cleaning unit cleans the filter more efficiently and removes more particulate matter off of the filter than prior art cleaning units.

Another object of the present invention is to provide a portable vacuum unit of the foregoing character wherein an integrated rotatable filter cleaning unit has a balanced geometry which requires less energy for rotation and minimizes wear of the moving parts.

Still another object of the present invention is to provide a portable vacuum unit of the foregoing character having a rotatable filter cleaning unit which uses air propulsion for rotating the cleaning unit, thus to eliminate the weight and expense of a separate motor for driving rotation.

A further object of the present invention is to provide a portable vacuum unit of the foregoing character in which the filter is housed in a dust container and may be cleaned several times before the dust container needs to be emptied.

It is still a further object of the present invention to provide a portable vacuum unit of the foregoing character wherein an integrated rotatable double air arm increases cleaning efficiency.

These and other objects of the invention will become apparent to those skilled in the art upon reading and understanding the detailed description of preferred embodiments hereinafter.

BRIEF DESCRIPTION OF THE DRAWINGS

The invention may take physical form in certain parts and arrangements of parts, a preferred embodiment of which is described in detail hereinafter and illustrated in the accompanying drawings which form a part hereof and wherein:

FIGS. 3 and 4 are enlarged fragmentary views of the air bar portion of the cleaning unit.

THE PREFERRED EMBODIMENT

Figure 1:
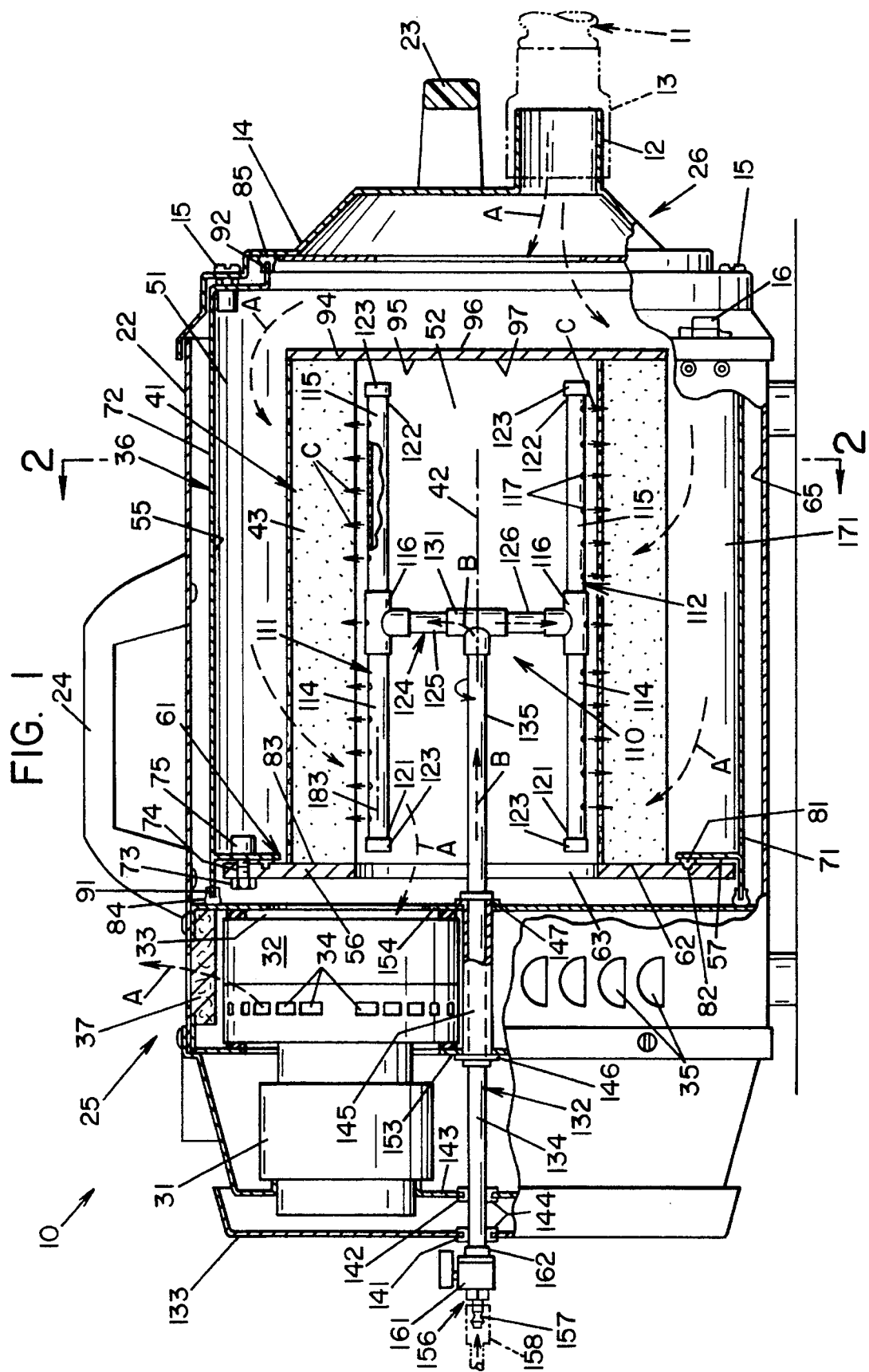
FIG. 1 is an elevation view of a portable vacuum unit taken in cross-section and showing a filter cleaning device according to the present invention.

Referring to the drawings wherein the showings are for the purpose of illustrating a preferred embodiment of the invention only and not for the purpose of limiting same, FIG. 1 shows a portable self-contained vacuum unit 10. Vacuum unit 10 is designed for extracting fumes, dust and smoke extraction from single work stations, such as welding stations. It will be appreciated that vacuum unit 10 may be used in any industrial environment where it is desired to remove dust, smoke and/or fumes from an operator's working and breathing area. Fumes, smoke or dust are extracted from a work station via a suction hose 11 which extracts fumes and dust in the vicinity of vacuum 10, generally within fifteen to twenty feet of vacuum 10. It will be appreciated that vacuum unit 10 is designed for use with a mobile or portable single work station unit, but it is also effective in fixed installations. The construction of vacuum unit 10 will allow it to be removably attached to any number of support members, including upside down installation to welding booms, thus liberating floor space. Suction hose 11 is generally connected to proper suction nozzles (not shown) allowing fume and dust to be removed from positions close to the point of generation, before fume or dust is dispersed into the surrounding atmosphere.

Suction hose 11 is connected to an inlet vacuum nozzle 12 having an outside diameter generally equal to the inside diameter of the coupling 13 of suction hose 11 for a relatively tight fit. Inlet vacuum nozzle 12 is a homogeneous part of the housing access panel 14 which is removably connected by snap grips 15 and snap grips 16 to the main housing shell 22.

In order to facilitate easy removal of housing access panel 14, an integral panel handle 23 is provided on housing access panel 14. It will be appreciated that vacuum unit 10 is a portable unit in that it is provided with panel handle 23, which, when snap grips 16 have been securely fastened, provides the dual purpose of allowing an operator to move vacuum unit to a subsequent work station. For this reason, housing shell 22 is also provided with a main handle 24 attached to main housing shell 22 to provide vacuum unit 10 with added mobility. Vacuum unit 10 further includes a drive motor 31 on the exhaust side 25 of vacuum unit 10. Drive motor 31 provides rotation to at least one fan (not shown) located within a fan housing 32. Fan housing 32 has an open end 33. Air is drawn through vacuum unit 10 by the fan and into open end 33 of fan housing 32. The general path of vacuum air or cleaning air through vacuum unit 10 is shown by the dashed arrows "A" which begin at the inlet side 26 of vacuum unit 10. Vacuum air A is drawn to fan housing 32 where it is expelled from the fan exhaust ports 34 into main housing shell 22 and ultimately out vents 35 located in main housing shell 22. Adjacent fan housing 32 is a sound absorption mat 37 for reducing the noise level of vacuum unit 10 created by drive motor 31 and the at least one fan within the fan housing.

Figure 2:
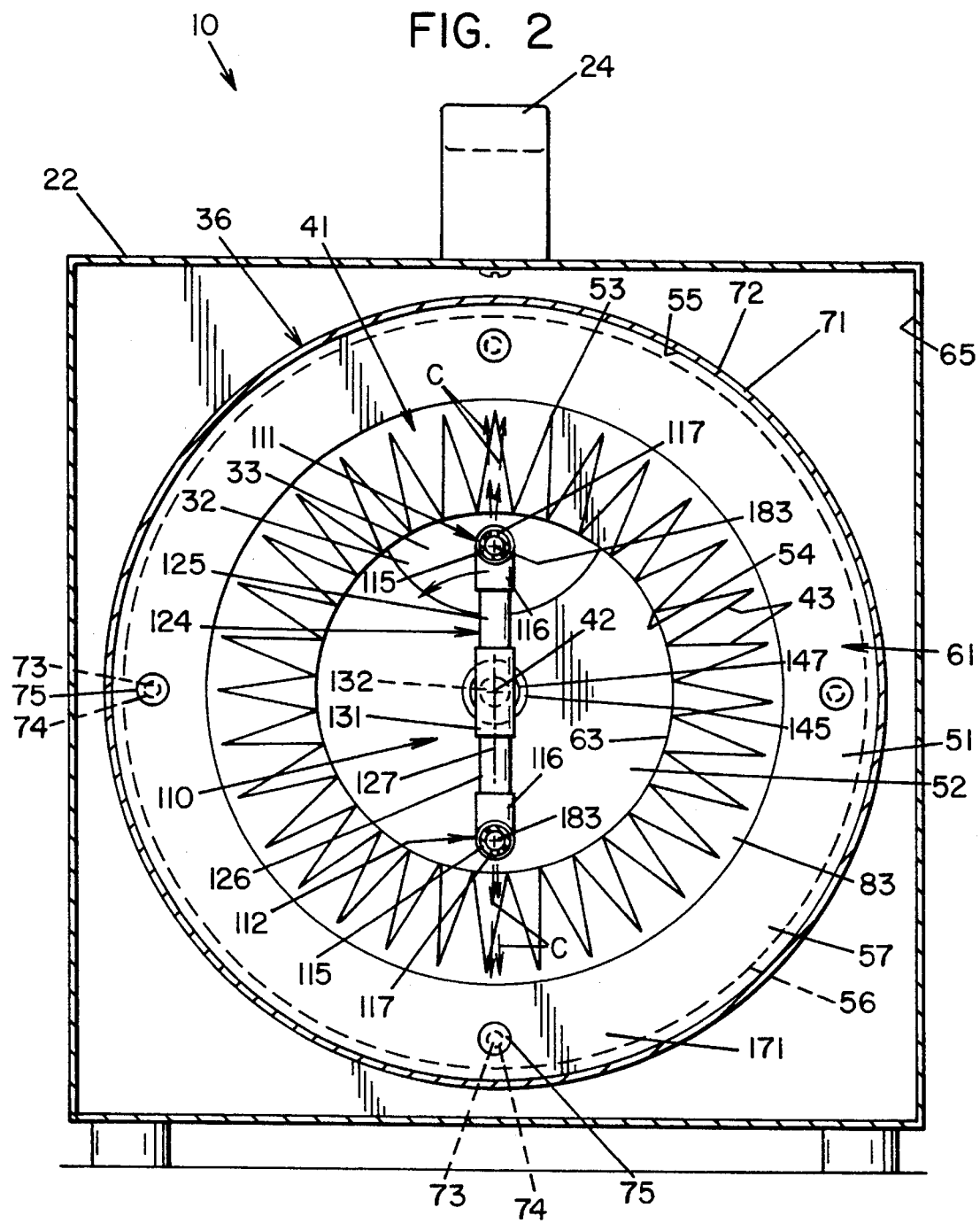
FIG. 2 is an end view taken along line 2—2 of FIG. 1 showing the filter cleaning unit and filter container of the vacuum unit.

A filter container 36 is located within main housing shell 22, as best shown in FIG. 2. Within filter container 36 is an annular shaped filter or filter cartridge 41 located about a central axis 42. Filter 41 may be comprised of any known air permeable filter medium through which it is capable of extracting fumes, dust smoke or fume and particulate matter. Such filters are well known in the prior art and will not be discussed in detail herein. As shown in FIG. 2, filter 41 is a pleated fabric defining the individual pleats 43 concentrically arranged around central axis 42. Air, entering the vacuum nozzle 12 is drawn into filter container 36 and into the vacuum air inlet chamber 51. Vacuum air A is then drawn through the filter medium of filter 41 and pleats 43, as shown by the arrows into the vacuum air outlet chamber 52. As best shown in FIG. 2, pleats 43 extend in an annular ring about central axis 42 to define an outer filter perimeter 53 and an inner filter perimeter 54. Outer filter perimeter 53 defines the inside diameter of vacuum air inlet chamber 51, while inner filter perimeter 54 defines the outer diameter of vacuum air outlet chamber 52. The inner container perimeter 55 of the filter container 36 defines the outer diameter of vacuum air inlet chamber 51 while the filter flange plate 56, together with container shell leg 57 forms inlet chamber end surface 61 of vacuum air inlet chamber 51.

The exhaust end 62 of filter 41 is in abutting relationship with filter flange plate 56 and is suitably secured thereto. Filter flange plate 56 has a flange plate opening 63 therein, flange plate opening 63 preferably being circular in shape and having a diameter generally equal to the outer diameter of vacuum air outlet chamber 52 and the diameter of inner filter perimeter 54. Thus, vacuum air A is drawn through filter 41 into vacuum air outlet chamber 52 and is further drawn through flange plate opening 63 into open end 33 of fan housing 32 from which it is expelled via fan exhaust ports 34. It is also noted that a housing shell filter medium (not shown) is provided along the housing shell inner perimeter 65 adjacent vents 35 in main housing 22. Housing shell filter medium further cleans any remaining fumes or smoke from vacuum air A.

The filter container shell 71 of filter container 36 is cylindrical in shape and forms inner container perimeter 55 as well as the outer container perimeter 72. As shown in FIG. 1, filter flange plate 56 is removably attached to filter container shell 71 by machine screws 73. Machine screws 73 pass through a screw opening 74 and a leg opening 75 which is substantial registry with screw opening 74. Leg opening 75 is located in container shell leg 57. Between adjacent surfaces of filter flange plate 56 and container shell leg 57 is a ring gasket 81. Ring gasket 81 is concentric about central axis 42 and placed partially within a circular groove 82 cut on the inlet chamber side 83 of filter flange plate 56. Thus, ring gasket 81 prevents vacuum air from being drawn between container shell leg 57 and filter flange plate 56. Therefore, all vacuum air A drawn into filter container 36 passes through filter 41 prior to being expelled from vacuum unit 10. Filter container 36 also includes snubber ring gaskets 84, 85. Snubber ring gasket 84 is located on the axial exhaust end 91 of filter container shell 71, while snubber ring gasket 85 is located on the axial inlet end 92 of filter container shell 71. Each gasket has a slot cut therein in order that it slides over axial ends 91, 92. As such, gasket 84 is adjacent outer container perimeter 72, inner container perimeter 55 and axial exhaust end 91, while gasket 85 is adjacent outer container perimeter 72, inner container perimeter 55 and axial inlet end 92. It will thus be appreciated that filter container 36 is a completely sealed and self-contained unit, wherein vacuum air A drawn into vacuum unit 10 via inlet vacuum nozzle 12 is forced to follow the path of vacuum air A through filter 41 and into vacuum air outlet chamber 52 prior to being drawn out of filter container 36 through flange plate opening 63.

Filter 41 includes a filter plate cap 94 having an air outlet chamber side 95 and an air inlet side 96. Filter plate cap 94 is generally perpendicular to central axis 42 in order to form a cap over the annular shape of filter 41. Air outlet chamber side 95 forms outlet chamber end surface 97 of vacuum air outlet chamber 52. Outlet chamber end surface 97 is directly opposite flange plate opening 63. Air inlet side 96 is generally adjacent to inlet vacuum nozzle 12. Thus, vacuum air inlet chamber 51 as previously described, is located between filter 41 and inner container perimeter 55 and is further located in the area between air inlet side 96 of filter plate cap 94 and housing access panel 14 in the vicinity of inlet vacuum nozzle 12.

In order to access filter container 36 and filter 41, an operator need only unfasten snap grips 16, grasp panel handle 23 and remove housing access panel 14 by drawing filter container 36 out of vacuum unit 10 in an axial direction parallel to central axis 42. Upon removal, filter container 36 may be emptied. It will be further appreciated that, when it is finally necessary to replace filter 41, such operation is done in the same manner, with the added steps of removing machine screws 73 and withdrawing filter 41 from filter container shell 71.

Located within vacuum air outlet chamber 52 is cleaning device 110. In the preferred embodiment, cleaning device 110 is H-shaped and includes two parallel air bars 111, 112 which are generally longitudinally coextensive with the inner periphery of filter 41 and radially inwardly adjacent the inner periphery of the filter 41. Each air bar 111, 112 is essentially comprised of a hollow tube or cylinder through which pressurized air, from a compressed air supply, is blown. Air bars 111, 112 further include air outlets 117 generally equally spaced along the entire longitudinal length of each of air bars 111, 112. The air outlets 117 operate to clean filter 41 as will be described in detail hereinafter. Preferably, for the purpose set forth hereinafter, outlets 117 in air bar 111 are longitudinally offset relative to outlets 117 in air bar 112.

Air bars 111, 112 are each comprised of two longitudinally extending coaxial sections 114, 115. Section 114 is joined to section 115 at a T-coupling 116. Each of sections 114 of air bars 111, 112 are located adjacent filter flange plate 56 and flange plate opening 63, while each of sections 115 of air bars 111, 112 are located perpendicular and adjacent to filter plate cap 94. Each of air bars 111, 112 has an inner end 121 and an outer end 122. At each of ends 121 and 122 is located an air bar end cap 123. Each of air bar end caps 123 prevents pressurized air from expelling out through ends 121 and 122.

Cleaning device 110 further includes a cross bar 124 generally perpendicular to and interconnecting air bars 111, 112. Cross bar 124 is comprised of two transversely extending coaxial sections 125, 126, each section being a hollow cylindrical tube connected to the corresponding air bar via T-coupling 116. Each of sections 125, 126 are connected to form cross bar 124 at T-coupling 131.

Connected to T-coupling 131 and coaxial with central axis 42 is an air supply line 132 which extends into filter container 36 from exhaust side 25 of vacuum unit 10 through flange plate opening 63. Air supply line 132 protrudes from vacuum unit 10 through service panel 133 at exhaust side 25 of main housing shell 22. In the preferred embodiment, supply line 132 is comprised of two homogeneous portions, an exhaust portion 134 and an outlet chamber portion 135. Outlet chamber portion 135 is located substantially within vacuum air outlet chamber 52, while exhaust portion 134 substantially comprises the remainder of air supply line 132 extending from vacuum air outlet chamber 52 through service panel 133. Each of air bars 111, 112, cross bar 124, air supply line 132, T-coupling 116 and T-coupling 131 are preferably constructed of lightweight plastic pipe. Such pipe requires less energy to begin and maintain rotation of cleaning device 110, as will be described hereinafter. However, it will be appreciated that the piping or tubing material of cleaning device 110 may be of any material, including metal and metal alloys.

Air supply line 132 is rotatably supported along its length at a number of locations to prevent stresses produced by flexural bending of any substantial unsupported length of the air supply line. Specifically, exhaust portion 134 is supported at the service panel opening 141 of service panel 133 and at the drive motor support opening 142 located within one of the motor support brackets 143. Each of openings 141, 142 have fixed therein a low friction coupling 144 having an inside diameter substantially equal to or slightly greater than the outside diameter of air supply line 132. Thus, air supply line 132 may freely rotate within low friction couplings 144. Further, exhaust portion 134 of air supply line 132 is rotatably supported by a sleeve 145 coaxial with central axis 42 and fixed at each of the axially opposite ends 146, 147 thereof in openings in the fan support brackets 153, 154. Sleeve 145 is essentially a fixed coupling or bearing having an inside diameter substantially equal to or slightly greater than the outside diameter of air supply line 132. The inside surface of sleeve 145 preferably is comprised of a material having low friction properties in order that air supply line 132 may freely rotate therein.

At the compressed air inlet 156 of air supply line 132 is a standard nipple 157 over which a flexible tube 158 is connected. The other end of flexible tube 158 is connected to a compressed air supply (not shown). The compressed air supply provides pressurized air or cleaning air to cleaning device 110 to clean filter 41. In order that the compressed air supply need not be disconnected when cleaning air is not required, air supply line 132 is provided with a solenoid shut off valve 161 and a rotating air coupling 162. Thus air supply line 132 may rotate while solenoid valve 161, compressed air inlet 156, nipple 157 and flexible tube 158 remain fixed.

The method of operation of the filter unit as thus far described is as follows. Compressed air, preferably between 4–6 bars, is introduced into air supply line 132 via compressed air inlet 156 as represented by the arrows showing the cleaning air B. Cleaning air B travels through air supply line 132 until it reaches T-coupling 131 where it then travels perpendicular and away from central axis 42 within cross bar 124 to parallel air bars 111, 112. As the air reaches T-couplings 116, cleaning air B travels within air bars 111, 112 and it is expelled out each of air outlets 117. Air outlets 117, being small holes effectively provide small jets of air C directed at filter 41. Compressed air applied in this manner effectively reverses the normal air direction through filter 41 dislodging particulate matter from filter 41 into vacuum air inlet chamber 51 where it settles within the base portion 171 of filter container 36, due to gravity. It will be appreciated that some dust may settle as conglomerate clumps within filter container 36 along inner container perimeter 55. Once particulate matter has been dislodged from individual pleats 43, the filter efficiency is improved and maintained for further vacuum operation without having to remove the filter or empty the container of accumulated material.

In order that air jets C from air outlets 117 circumferentially traverse the entire inner filter perimeter 54, cleaning device 110 is rotated about central axis 42 during the cleaning operation. In the preferred embodiment, rotating coupling 162 allows air supply line 132 to rotate about central axis 42. This enables air bars 111, 112 to rotate about axis 42 and to move in a circular fashion about the inner perimeter 54 of filter 41 thus removing particulate matter from the filter pleats 43 between inner and outer filter perimeters 54 and 53 of filter 41. In the preferred embodiment, the spacing between adjacent air outlet on each air bar 111, 112 and the relationship between the outlets in the two bars is designed so that, upon rotation, the entire inner filter perimeter 54 of filter 41 is subjected to cleaning by the air jets. In particular in this respect, as mentioned hereinabove, the outlets in the two bars are offset whereby each of air outlets 117 on air bar 111 circumferentially traverse a different portion of filter 41 than do complementary air outlets 117 on air bar 112. Thus, spacing limitations between adjacent air outlets on a given air bar which, as is well known in the prior art, affects cleaning operation and efficiency, are avoided in accordance with the present invention.

While rotation of cleaning device 110 may be by any number of known means, i.e. manually or with a small motor, vacuum unit 10 preferably incorporates a unique feature to effect self rotation of cleaning device 110. This feature uses the cleaning air for air propulsion by providing for at least some of the air outlets 117 to be in a driving orientation relative to filter 41. In this respect, as will become apparent hereinafter, the driving air outlets are placed in air bars 111, 112 slightly offset or askewed radially relative to inner filter perimeter 54. More particularly in this respect, as will be appreciated from the orientation of air outlet 117A as shown in FIG. 3, air bars 111, 112 have axes 183 parallel to central axis 42 and perpendicular to cross bar axis 127, and each of the air outlets 117A opens radially outwardly through the corresponding air bar along a corresponding radial axis 181 parallel to axis 127. However, as will be appreciated from air outlets 117B shown in FIG. 4, air outlets 117B are located on a radial axis 182 from the corresponding air bar axis 183 and which axis 182 is at an angle to axis 181 of outlets 117A. Propulsion outlet axes 182 are generally at an angle between 0° to 45° from air outlet axes 181. Cleaning device 110 rotates about central axis 42 due to the energy of air jets C directed onto the face of succeeding ones of the individual pleats 43 of filter container 41 from outlets 117B at an angle such that motion is induced and continues so long as air is supplied to the jets. It will be appreciated that motion is induced since each propulsion outlet 117B and accompanying air jet C is directed at an angle offset from radial relative to central axis 42 and toward inner filter perimeter 54, and specifically, at a reaction angle to a tangent line to inner filter perimeter 54 less than 90°.

In the preferred embodiment each of air bars 111, 112 are comprised of both air outlets 117A located on air outlet axes 181 and air outlets 117B located on propulsion outlet axes 182. In this respect, for example the outlets 117A and 117B may alternate along the length of the corresponding air bars. While some of the energy from the cleaning air is used to rotate cleaning device 110 through outlets 117B as described, it will be appreciated that all of the energy is used for cleaning filter 41. The number of air outlets 117B required on each air bar to effectively begin and maintain rotation of cleaning unit 110 is a function of the size and material comprising air bars 111, 112 and cross bar 124, as well as the degree of the reaction angle, the pressure provided from the compressed air supply, and the pressure drop between the compressed air supply and air outlets 117. Further, the pressure drop is a function of both the number of air outlets 117 and the size of the air outlets. It will be appreciated that air bars 111, 112 may be only comprised of air outlets 117A, as shown in FIG. 3. In such case, rotation of cleaning unit 110 is by means other than air propulsion. Such means may be, for example, motor driven rotation or manual rotations, both methods well known in the prior art. Further, it will be appreciated that air bars 111, 112 may be entirely comprised of propulsion air outlets 117B without substantially affecting efficiency of the cleaning operation. When the operator desires to begin the cleaning operation of filter 41, a plug, (not shown) is preferably placed within vacuum nozzle 12 to prevent air from escaping from vacuum air inlet chamber 51 and to prevent air back flow into suction hose 11. Compressed air, at preferably between 4–6 bars, is fed into air supply line 132 when solenoid valve 161 is opened. Cleaning air B then travels through cross-bar 124 to parallel air bars 111, 112 and out air outlets 117 to rotate cleaning unit 110. The dust and the dust cakes are released from individual pleats 43 by air jets C. Dust and dust cakes are collected in filter container 36. After the cleaning operation is complete, the compressed air supply is cut-off by the closing of solenoid valve 161. Clean filter 41 is then again ready for service with improved efficiency. When filter container 36 is filled with dust and dust cakes, it can be removed and emptied as described hereinabove.

The cleaning operation of the present invention is a distinct advantage and corrects many of the problems experienced with prior art machines. For example, many of the prior art machines are not operated efficiently because filter cleaning intentionally is avoided when it is a difficult or impossible and dirty job. Thus, vacuum unit 10 is provided with an effective filter cleaning device giving consistent suction, low filter costs and easy disposal. The frequent filter changes traditionally required in vacuum units for single work stations is avoided. Filter 41 may be cleaned several times before the filter container 36 needs to be emptied. As described above, filter container 36 may be emptied by simply unfastening snap grips 16 and removing filter container 36 and filter 41 from main housing shell 22.

The cleaning unit can be designed for automatic cleaning by installing solenoid valve 161 with a time relay (not shown) in order that filter 41 may be cleaned at preprogrammed and timed intervals. Alternatively, solenoid valve 161 may be replaced with a standard ball valve (not shown). The above-referenced air driven feature eliminates the expense of an additional drive motor to vacuum unit 10. The features of the present invention result in an economical portable vacuum unit with an added self-cleaning filter feature without significantly adding additional weight or cost to vacuum unit 10.

The invention is described with reference to preferred and alternative embodiments. Obviously modifications and alterations other than those discussed herein will occur to those skilled in the art upon reading and understanding the invention. It is intended to include all such modifications in so far as they come within the scope of the invention.

Having thus described the invention, it is claimed:

1. A portable vacuum for fume and dust extraction comprising:

a housing, fan means within said housing for creating vacuum pressure, and means for driving said fan means;

a filter container, defined by a filter container shell within said housing;

filter means within said filter container for extracting fume and dust, said housing including access panel means for removing said filter container shell from said housing; and a self propelling rotatable cleaning unit in said filter container for cleaning said filter means, said cleaning unit being connectable to a source of propelling and cleaning air and rotatably mounted within said housing only at a location opposite said access panel means and outside of the filter container.

2. The portable vacuum of claim 1, wherein said filter means includes an annular filter having an inner periphery and a central axis, said cleaning unit being within said periphery and rotatable about said central axis.

3. The portable vacuum of claim 2, wherein said rotatable cleaning unit includes at least two means adjacent said inner periphery for directing cleaning and propelling air against said filter.

4. The portable vacuum of claim 3, wherein each said means for directing cleaning and propelling air includes an air bar having a plurality of air outlets directed radially toward said filter and a plurality of air outlets directed at a reaction angle toward said filter.

5. The portable vacuum of claim 4, wherein said cleaning means includes a pair of said air bars generally parallel to one another and connected by a cross-bar generally orthogonal thereto.

6. The portable vacuum of claim 5, wherein said air bars have axially opposite ends and said cross-bar is generally centrally between said ends.

7. The portable vacuum of claim 1, where said cleaning air is pressurized air.

8. A portable vacuum for fume and dust extraction comprising:

- a housing;
- at least one fan within said housing for creating suction, and means for driving said fan;
- annular filter means within said housing for extracting fume and dust, said filter means having an axis;
- a filter container defined by a filter container shell within said housing; and
- a cleaning unit located within and unconnected to said filter container including air propulsion means for rotating said cleaning unit about said axis for cleaning said filter means, said cleaning unit comprising two axially extending air bars connected by a crossbar, said air bars diametrically opposed, air supply tube means coaxial with said axis and having an air inlet end connectable to a source of pressurized air, said tube means rotatably mounted outside said filter container shell, said tube means having an outlet end connected to said crossbar, each of said air bars including air outlets for directing air against said filter means for rotating said air bars about said axis relative to said filter means, and means for removing said filter means from said housing without disturbing said cleaning unit.

* * * * *